United States Patent
Xu et al.

(10) Patent No.: US 10,901,638 B2
(45) Date of Patent: Jan. 26, 2021

(54) CASCADING BOARD AND SSD SHARED REMOTE ACCESS SYSTEM AND METHOD

(71) Applicant: Huawei Technologies Co., Ltd., Shenzhen (CN)

(72) Inventors: Huifeng Xu, Shenzhen (CN); Haitao Guo, Hangzhou (CN); Yu Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/118,850

(22) Filed: Aug. 31, 2018

(65) Prior Publication Data

US 2018/0373454 A1    Dec. 27, 2018

Related U.S. Application Data

(63) Continuation of application No. PCT/CN2017/074148, filed on Feb. 20, 2017.

(30) Foreign Application Priority Data

Mar. 1, 2016 (CN) .......................... 2016 1 0115698

(51) Int. Cl.
*G06F 3/06* (2006.01)
*G06F 13/28* (2006.01)

(52) U.S. Cl.
CPC .......... *G06F 3/0637* (2013.01); *G06F 3/0605* (2013.01); *G06F 3/0622* (2013.01); *G06F 3/0679* (2013.01); *G06F 13/28* (2013.01)

(58) Field of Classification Search
CPC ............... G06F 1/00–3296; G06F 3/00; G06F 3/06–0689; G06F 5/00–16;

(Continued)

(56) References Cited

U.S. PATENT DOCUMENTS 9,304,690 B2 * 4/2016 McCambridge ...... G06F 3/0613
9,483,431 B2 * 11/2016 Bergsten ............. H04L 67/1097
(Continued)

FOREIGN PATENT DOCUMENTS

CN    101212490 A    7/2008
CN    102955753 A    3/2013
(Continued)

OTHER PUBLICATIONS

Under the Hood with NVMe over Fabrics; Minturn et al.; Dec. 15, 2015; retrieved from https://www.snia.org/sites/default/files/ESF/NVMe_Under_Hood_12_15_Final2.pdf on Oct. 10, 2019 (Year: 2015).*

(Continued)

*Primary Examiner* — Daniel C. Chappell
(74) *Attorney, Agent, or Firm* — Conley Rose, P.C.

(57) ABSTRACT

A cascading board, a solid state drive (SSD) shared remote access system and method relate to the communications field and used to perform shared remote access to an SSD. One end of the cascading board is coupled to a remote direct memory access (RDMA) network, and another end is coupled to an SSD. The cascading board includes an access processing apparatus and a processor coupled to the access processing apparatus. The processor is configured to initialize the access processing apparatus and the SSD. The access processing apparatus is configured to implement RDMA to the SSD when receiving an access command from the RDMA network.

19 Claims, 3 Drawing Sheets

(58) Field of Classification Search
CPC ..... G06F 9/00–548; G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 11/00–5692; G11C 13/00–06; G11C 14/00–009; G11C 15/00–06; G11C 16/00–3495; G11C 17/00–18; G11C 2216/00–30
See application file for complete search history.

(56) References Cited

U.S. PATENT DOCUMENTS

| | | | | |
|---|---|---|---|---|
| 9,513,869 | B2* | 12/2016 | Vucinic | G06F 3/0656 |
| 9,727,503 | B2* | 8/2017 | Kagan | G06F 13/28 |
| 9,778,859 | B2* | 10/2017 | Vucinic | G06F 12/08 |
| 9,934,177 | B2* | 4/2018 | Goren | G06F 3/067 |
| 9,998,558 | B2* | 6/2018 | Sammatshetti | G06F 3/0659 |
| 10,019,181 | B2* | 7/2018 | Singh | G06F 3/0619 |
| 10,235,064 | B1* | 3/2019 | Natanzon | G06F 3/0619 |
| 10,379,745 | B2* | 8/2019 | Vyshetsky | G06F 3/061 |
| 10,423,568 | B2* | 9/2019 | Berman | G06F 3/0656 |
| 10,437,481 | B2* | 10/2019 | Tan | G06F 3/0659 |
| 10,572,161 | B2* | 2/2020 | Subramanian | G06F 15/17331 |
| 10,572,185 | B2* | 2/2020 | Hahn | G06F 3/0613 |
| 10,656,874 | B2* | 5/2020 | Qiu | G06F 3/0679 |
| 10,705,974 | B2* | 7/2020 | Qiu | G06F 3/0688 |
| 2008/0313364 | A1* | 12/2008 | Flynn | G06F 12/0804 710/31 |
| 2013/0275631 | A1 | 10/2013 | Magro et al. | |
| 2014/0149607 | A1 | 5/2014 | Shim et al. | |
| 2014/0223071 | A1 | 8/2014 | Bert et al. | |
| 2015/0012607 | A1 | 1/2015 | Cayton et al. | |
| 2015/0026368 | A1* | 1/2015 | Kagan | G06F 13/28 710/22 |
| 2015/0032841 | A1 | 1/2015 | Vasudevan et al. | |
| 2015/0254003 | A1* | 9/2015 | Lee | G06F 13/382 711/103 |
| 2015/0263887 | A1* | 9/2015 | Sajeepa | H04L 41/0803 709/220 |
| 2016/0306580 | A1* | 10/2016 | Pinto | G06F 13/4282 |
| 2017/0149920 | A1* | 5/2017 | Sammatshetti | H04L 67/2842 |
| 2018/0067685 | A1* | 3/2018 | Deng | G06F 3/06 |
| 2018/0335957 | A1* | 11/2018 | Enz | G06F 3/0613 |

FOREIGN PATENT DOCUMENTS

| | | |
|---|---|---|
| CN | 103678201 A | 3/2014 |
| CN | 103838687 A | 6/2014 |
| CN | 103970688 A | 8/2014 |
| CN | 104094244 A | 10/2014 |
| CN | 104202194 A | 12/2014 |
| CN | 104283938 A | 1/2015 |
| CN | 105224502 A | 1/2016 |
| CN | 106919487 A | 7/2017 |
| EP | 2711845 B1 | 12/2015 |

OTHER PUBLICATIONS

An NVM Express Tutorial; Marks, Kevin; 2013; retrieved from https://www.flashmemorysummit.com/English/Collaterals/Proceedings/2013/20130812_PreConfD_Marks.pdf on Oct. 11, 2019 (Year: 2013).*
How Ethernet RDMA Protocols iWARP and RoCE Support NVMe over Fabrics; Kim et al.; Jan. 26, 2016; retrieved from https://www.snia.org/sites/default/files/ESF/How_Ethernet_RDMA_Protocols_Support_NVMe_over_Fabrics_Final.pdf on Oct. 10, 2019 (Year: 2016).*
NVM Express Revision 1.0; NVMExpress.org; Mar. 1, 2011; retrieved from https://nvmexpress.org/wp-content/uploads/NVM-Express-1_0-Gold.pdf on Jan. 20, 2020 (Year: 2011).*
Z. An et al., "Optimizing the Datapath for Key-value Middleware with NVMe SSDs over RDMA Interconnects," 2017 IEEE International Conference on Cluster Computing (CLUSTER), Honolulu, HI, 2017, pp. 582-586 (Year: 2017).*
Machine Translation and Abstract of Chinese Publication No. CN104202194, Dec. 10, 2014, 25 pages.
Machine Translation and Abstract of Chinese Publication No. CN105224502, Jan. 6, 2016, 13 pages.
Machine Translation and Abstract of Chinese Publication No. CN106919487, Jul. 4, 2017, 25 pages.
Foreign Communication From a Counterpart Application, PCT Application No. PCT/CN2017/074148, English Translation of International Search Report dated May 24, 2017, 2 pages.
Foreign Communication From a Counterpart Application, PCT Application No. PCT/CN2017/074148, English Translation of Written Opinion dated May 24, 2017, 4 pages.
Machine Translation and Abstract of Chinese Publication No. CN102955753, Mar. 6, 2013, 7 pages.
Foreign Communication From a Counterpart Application, Chinese Application No. 201610115698.0, Chinese Office Action dated Mar. 4, 2019, 10 pages.

* cited by examiner

CASCADING BOARD AND SSD SHARED REMOTE ACCESS SYSTEM AND METHOD

CROSS-REFERENCE TO RELATED APPLICATIONS

This application is a continuation of International Patent Application No. PCT/CN2017/074148 filed on Feb. 20, 2017, which claims priority to Chinese Patent Application No. 201610115698.0 filed on Mar. 1, 2016. The disclosures of the aforementioned applications are hereby incorporated by reference in their entireties.

TECHNICAL FIELD

The present disclosure relates to the communications field, and particularly, to a cascading board and a solid state drive (SSD) shared remote access system and method.

BACKGROUND

An SSD is a hard disk formed from a solid-state electronic storage chip array. The SSD is becoming increasingly popular because of advantages such as fast reading/writing, low power consumption, and portability.

Currently, with continuous improvement of capacity and performance of the SSD, people draw more attention to sharing a single SSD or a group of SSDs with other different devices that are connected using a network, to make full use of multiple features of the SSD.

In a process of implementing shared remote access to the SSD using a related technology, access from a remote device to the SSD is processed by a processor (e.g. central processing unit (CPU)). That is, the processor receives an SSD access command from a remote direct memory access (RDMA) network, and forwards the command to a corresponding SSD. However, in this access manner, a software processing time is added, thereby causing an increase in an access delay.

SUMMARY

Embodiments of the present disclosure provide a cascading board and an SSD shared remote access system and method in order to reduce a delay of shared remote access to an SSD.

According to a first aspect, a cascading board is provided, where one end of the cascading board is connected to an RDMA network, another end is connected to an SSD, and the cascading board includes an access processing apparatus and a CPU that is coupled to the access processing apparatus, where the CPU is configured to initialize the access processing apparatus and the SSD, and the access processing apparatus is configured to implement RDMA access to the SSD when receiving an access command from the RDMA network.

The access processing apparatus is an apparatus for processing shared remote access, while the CPU does not process the shared remote access, but is configured to initialize the access processing apparatus and the SSD. In this way, a software processing time added because the CPU implements shared remote access to the SSD may be avoided such that a delay of the shared remote access to the SSD can be reduced, and the shared remote access to the SSD is implemented without an increase in an access time.

With reference to the first aspect, in a first possible implementation, the access processing apparatus includes an RDMA interface and a memory, where the RDMA interface is configured to connect to the RDMA network, and the memory is configured to store an access queue.

In this embodiment of the present disclosure, the access processing apparatus completes the RDMA to the SSD. The memory may be disposed in the access processing apparatus in order to store the access queue. The RDMA interface is correspondingly disposed in the access processing apparatus to facilitate connection to the RDMA network.

With reference to the first aspect, in a second possible implementation, the cascading board further includes a Peripheral Component Interconnect express (PCIe) switching chip, where the PCIe switching chip is separately connected to the CPU and the access processing apparatus, and is connected to the SSD.

In this embodiment of the present disclosure, when there is no PCIe switching chip, the CPU is directly connected to the SSD. In this connection manner, a quantity of SSDs connected to the CPU is limited, that is, there may not be many SSDs connected to the CPU. Therefore, when there are many SSDs, a manner in which the CPU is directly connected to the SSD cannot meet a requirement. In this embodiment of the present disclosure, the PCIe switching chip is added. On the one hand, the cascading board may be connected to more SSDs using a PCIe switching chip. On the other hand, an access processing apparatus and a CPU may be better connected, and the PCIe switching chip acts as an adapter between the access processing apparatus and the CPU to implement efficient forwarding and transmission of data.

With reference to the second implementation of the first aspect, in a third possible implementation, the access processing apparatus includes a PCIe interface, an RDMA interface, and a memory, where the PCIe interface is configured to connect to the PCIe switching chip, the RDMA interface is configured to connect to the RDMA network, and the memory is configured to store an access queue.

If there is the PCIe switching chip in the cascading board, correspondingly, in addition to the RDMA interface and the memory, the PCIe interface may be disposed in the access processing apparatus in order to connect to the PCIe switching chip.

With reference to any one of the foregoing implementations of the first aspect, in a fourth possible implementation, the access processing apparatus is a field programmable gate array (FPGA) or an application-specific integrated circuit (ASIC). The FPGA and the ASIC are particularly suitable as the access processing apparatus because of their relatively fast processing speed.

With reference to the fourth implementation of the first aspect, in a fifth possible implementation, the CPU, the access processing apparatus, and the PCIe switching chip are integrated together. In this embodiment of the present disclosure, the CPU, the access processing apparatus, and the PCIe interaction chip may be integrated together, for example, integrated on one chip. In this way, the cascading board may save space.

According to a second aspect, an SSD shared remote access system is provided, where the system includes at least one SSD, at least one controller, and the cascading board according to the first aspect, where the controller is connected to the cascading board using an RDMA network, and sends an access command to the access processing apparatus using the RDMA network.

The controller may be a storage controller.

According to the SSD shared remote access system provided in this embodiment of the present disclosure, the CPU initializes the access processing apparatus and the SSD, and the access processing apparatus completes RDMA to the SSD such that an initialization process and an access process can be two processes independent of each other. Such hardware as the access processing apparatus (such as an FPGA or ASIC) is added to complete the RDMA access to the SSD such that a software processing time added because the CPU implements the RDMA access to the SSD may be avoided, a delay of shared remote access to the SSD can be reduced, and the shared remote access to the SSD is implemented without an increase in an access time.

With reference to the second aspect, in a possible implementation, the system further includes an RDMA switch, where the RDMA switch is configured to connect the controller and the cascading board.

When there are many cascading boards, the SSD shared access system provided in this embodiment of the present disclosure may further include a plurality of RDMA switches, and the RDMA switches are configured to connect to the plurality of cascading boards. Certainly, within the scope of the present disclosure, when there are a few cascading boards, only one RDMA switch may be used for connection.

According to a third aspect, an SSD shared remote access method is provided, and the method includes initializing, by a CPU, an access processing apparatus and an SSD, and implementing, by the access processing apparatus, RDMA access to the SSD when receiving an access command from an RDMA network.

According to the SSD shared remote access method in this embodiment of the present disclosure, the CPU initializes the access processing apparatus and the SSD, and the access processing apparatus completes RDMA to the SSD such that an initialization process and an access process can be two processes independent of each other. Such hardware as the access processing apparatus (such as an FPGA or ASIC) is added to complete the RDMA access to the SSD such that a software processing time added because the CPU implements the RDMA access to the SSD may be avoided, a delay of shared remote access to the SSD can be reduced, and the shared remote access to the SSD is implemented without an increase in an access time.

With reference to the third aspect, in a first possible implementation, the initializing, by a CPU, an access processing apparatus includes allocating, by the CPU according to configuration information of an access queue, a storage space that is used to store the access queue and that is on the access processing apparatus, and initializing the access queue, and designating, by the CPU, an interrupt receive end as the access processing apparatus.

In this embodiment of the present disclosure, the CPU initializes the access processing apparatus. During an initialization process, the interrupt receive end is designated as the access processing apparatus. In this way, after executing the shared remote access command subsequently, the SSD feeds back an interrupt to the access processing apparatus, not to the CPU. The access processing apparatus can learn, according to the interrupt fed back by the SSD, that the SSD has executed the command.

With reference to the third aspect or the first implementation of the third aspect, in a second possible implementation, the implementing, by the access processing apparatus, RDMA access to the SSD when receiving an access command includes prompting, by the access processing apparatus, an SSD corresponding to the access command to perform an access operation when receiving the access command, and returning, by the access processing apparatus, data or status information using the RDMA network after receiving an interrupt from the SSD.

After the CPU initializes the access processing apparatus, when receiving a command for accessing the SSD subsequently, the access processing apparatus can process the access command according to a new operation procedure.

With reference to any one of the implementations of the third aspect, in a third possible implementation, the access processing apparatus is an FPGA or ASIC. The FPGA and the ASIC are particularly suitable as the access processing apparatus because of their relatively fast processing speed.

Optionally, a PCIe interaction chip exists between the CPU and the access processing apparatus, and interaction between the CPU and the access processing apparatus may be implemented using the PCIe interaction chip.

In this embodiment of the present disclosure, the CPU, the access processing apparatus, and the PCIe interaction chip may be integrated together, for example, integrated on one chip. In this way, the cascading board may save space.

According to the cascading board and the SSD shared remote access system and method provided in the embodiments of the present disclosure, the CPU initializes the access processing apparatus and the SSD, and the access processing apparatus completes RDMA to the SSD such that an initialization process and an access process can be two processes independent of each other. Such hardware as the access processing apparatus (such as the FPGA or the ASIC) is added to complete the RDMA access to the SSD such that a software processing time added because the CPU implements the RDMA access to the SSD may be avoided, a delay of shared remote access to the SSD can be reduced, and the shared remote access to the SSD is implemented without an increase in an access time.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the implementations of the present disclosure in detail with reference to the accompanying drawings.

Figure 1:
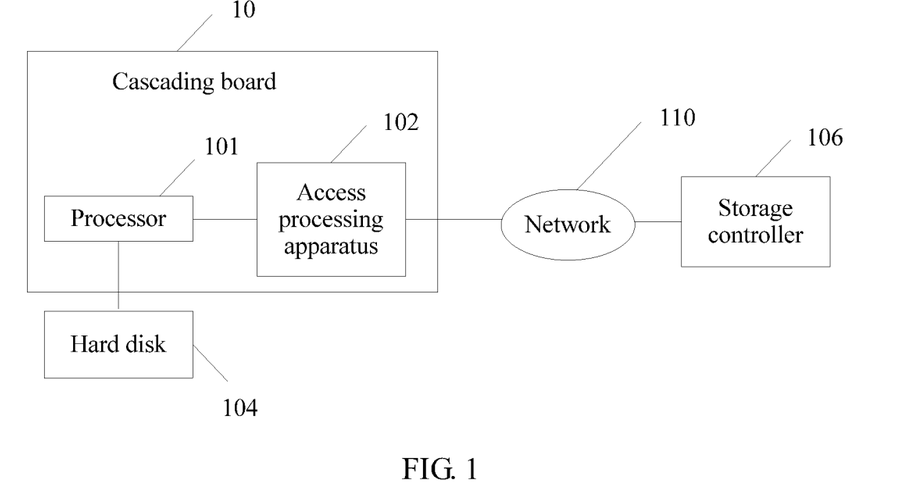
FIG. 1 is a diagram of a basic framework of an SSD shared remote access system according to an embodiment of the present disclosure.

FIG. 1 is a diagram of a basic framework of an SSD shared remote access system according to an embodiment of the present disclosure.

Referring to FIG. 1, the SSD shared remote access system according to this embodiment of the present disclosure may include a cascading board 10, a hard disk 104 connected to the cascading board, and a storage controller 106 connected to the cascading board using a network 110. The storage controller 106 may be a separate apparatus, or may be a controller that is in a network device and that is connected to a network. The storage controller 106 is configured to receive an RDMA access request, and control an operation of the cascading board 10. The RDMA access request may be from any network device on the network. The hard disk 104 connected to the cascading board may be an SSD such as a PCIe SSD. The PCIe SSD may be non-volatile memory express (NVMe) SSD and a non-NVMe SSD. The NVMe is an SSD access protocol defined by INTEL Corporation. When the PCIe SSD is a non-NVMe SSD, an access protocol of the non-NVMe SSD is open. The network 110 may be an RDMA network. In this embodiment of the present disclosure, the storage controller 106 and the cascading board 10 may be in a same local area network, or certainly the storage controller 106 and the cascading board 10 may be in different local area networks.

The cascading board 10 may include an access processing apparatus 102 and a processor (i.e. CPU) 101 that is coupled to the access processing apparatus 102. The access processing apparatus 102 in the cascading board may be connected to the network 110, and the processor 101 may be connected to the hard disk 104. The access processing apparatus 102 may be an FPGA, an ASIC, or the like.

The processor 101 is configured to initialize the access processing apparatus and the SSD when being powered on.

The access processing apparatus 102 is configured to implement RDMA access to the hard disk 104 when receiving an access command from the RDMA network 110.

The storage controller 106 may send the access command to the access processing apparatus 102 using the network 110.

According to the cascading board in this embodiment of the present disclosure, the CPU initializes the access processing apparatus and the SSD, and the access processing apparatus implements RDMA to the SSD such that an initialization process and an access process can be two processes independent of each other. Such hardware as the access processing apparatus (such as the FPGA or the ASIC) is added to implement the RDMA access to the SSD such that a software processing time added because the CPU implements the RDMA access to the SSD may be avoided, a delay of shared remote access to the SSD can be reduced, and the shared remote access to the SSD is implemented without an increase in an access time.

Figure 2:
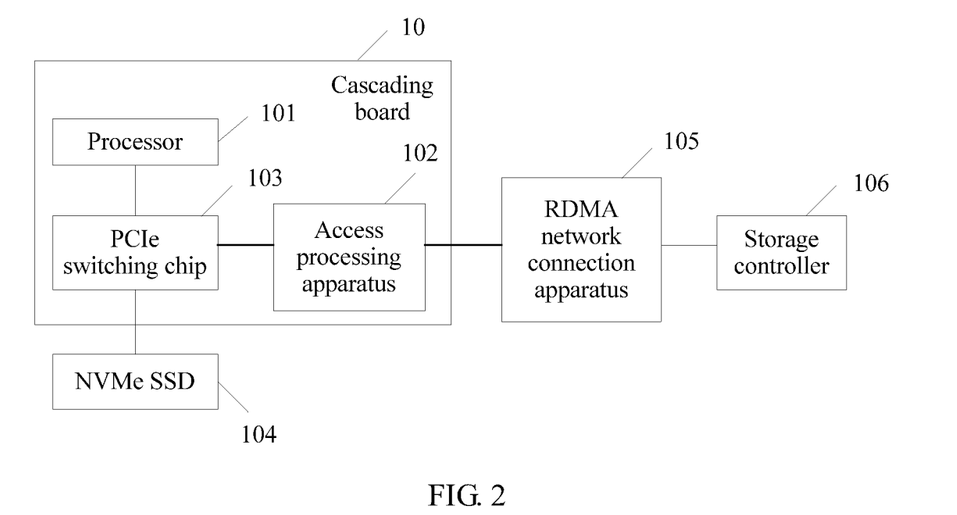
FIG. 2 is a diagram of a basic framework of another SSD shared remote access system according to an embodiment of the present disclosure.

FIG. 2 is a diagram of a basic framework of another SSD shared remote access system according to an embodiment of the present disclosure. With reference to FIG. 1, in the following description, that an access processing apparatus 102 in the system shown in FIG. 2 is an FPGA or ASIC, a hard disk 104 is an NVMe SSD, and a network 110 is an RDMA network is used as an example for description.

On the basis of the embodiment shown in FIG. 1, a PCIe switching chip 103 is added to a cascading board 10 in the system shown in FIG. 2. That is, in addition to the processor 101 and the access processing apparatus 102, the cascading board 10 may further include the PCIe switching chip 103. The PCIe switching chip 103 is separately connected to the CPU 101 and the access processing apparatus 102, and is connected to the NVMe SSD 104.

The system shown in FIG. 2 may further include an RDMA network connection apparatus 105. The RDMA network connection apparatus 105 is located in the RDMA network (not shown), and acts as an interface of the RDMA network to connect the storage controller 106 and the access processing apparatus 102.

In this embodiment of the present disclosure, the RDMA network connection apparatus 105 may be an FPGA or ASIC, or may be a common network chip that supports the RDMA network.

The NVMe SSD 104 is an SSD having a standard PCIe interface. The NVMe SSD 104 and the access processing apparatus 102 are connected to the processor 101 using the PCIe switching chip 103. As a host of the NVMe SSD 104 and the access processing apparatus 102, the processor 101 completes initialization configuration and management of the NVMe SSD 104 and the access processing apparatus 102. However, the processor 101 does not participate in a specific hard disk access service.

In this embodiment, the PCIe switching chip 103 is added to the cascading board 10. On one hand, the cascading board 10 may be connected to more SSDs using the PCIe switching chip 103 (because a quantity of SSDs connected to the CPU in a manner shown in FIG. 1 is often limited). On the other hand, the access processing apparatus 102 and the CPU 101 may be better connected, and the PCIe switching chip 103 acts as an adapter between the access processing apparatus 102 and the CPU 101 to implement efficient forwarding and transmission of data.

In this embodiment of the present disclosure, the access processing apparatus 102 may be a customized network chip. The network chip features that a specific storage space (for example, a random access memory (RAM)) is provided inside the network chip, and creating and managing an NVMe access queue are allowed.

Figure 3:
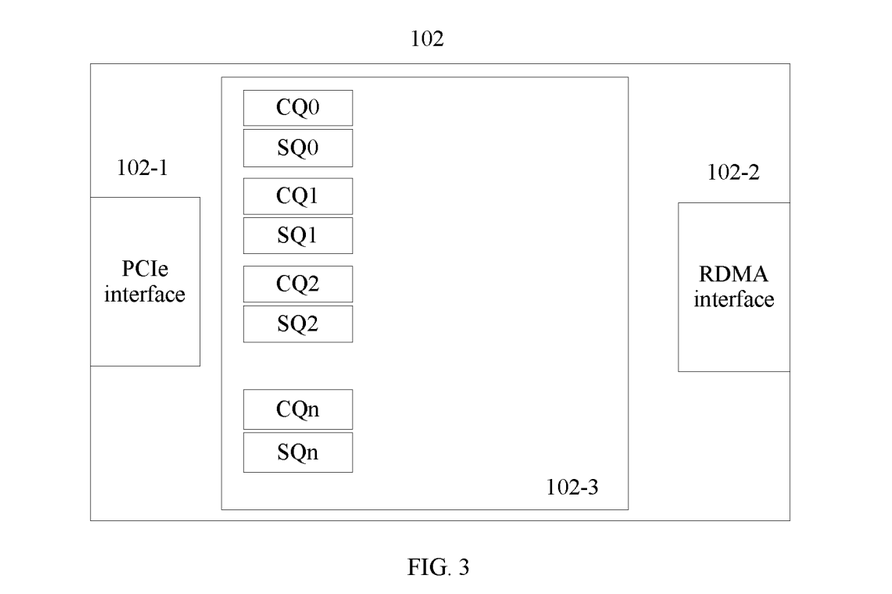
FIG. 3 is a diagram of an internal structure of an access processing apparatus according to an embodiment of the present disclosure.

FIG. 3 is a diagram of an internal structure of an access processing apparatus 102 according to an embodiment of the present disclosure. Referring to FIG. 3, the access processing apparatus 102 shown in FIG. 3 is an FPGA or ASIC. The access processing apparatus 102 may include a PCIe interface 102-1, an RDMA interface 102-2, and a memory 102-3.

The PCIe interface 102-1 is configured to connect to the PCIe switching chip.

The RDMA interface 102-2 is configured to connect to an external network, such as an RDMA network.

The memory 102-3 is configured to store an access queue.

The memory 102-3 may be a RAM, and the processor is allowed to create an NVMe access queue in this storage space. After performing an operation on a completion queue (CQ)/submission queue (SQ), a storage controller 106 triggers a doorbell controller (doorbell) corresponding to an NVMe SSD.

It should be noted herein that, in a case shown in FIG. 1, that is, when there is no PCIe switching chip 103, the access processing apparatus 102 may include only the RDMA interface 102-2 and the memory 102-3, and does not include the PCIe interface 102-1.

The SSD shared remote access system provided in this embodiment is applicable when a cascading board is connected to a plurality of SSDs such that a delay of shared remote access to an SSD can be reduced, and a storage controller can efficiently access the plurality of SSDs.

Figure 4:
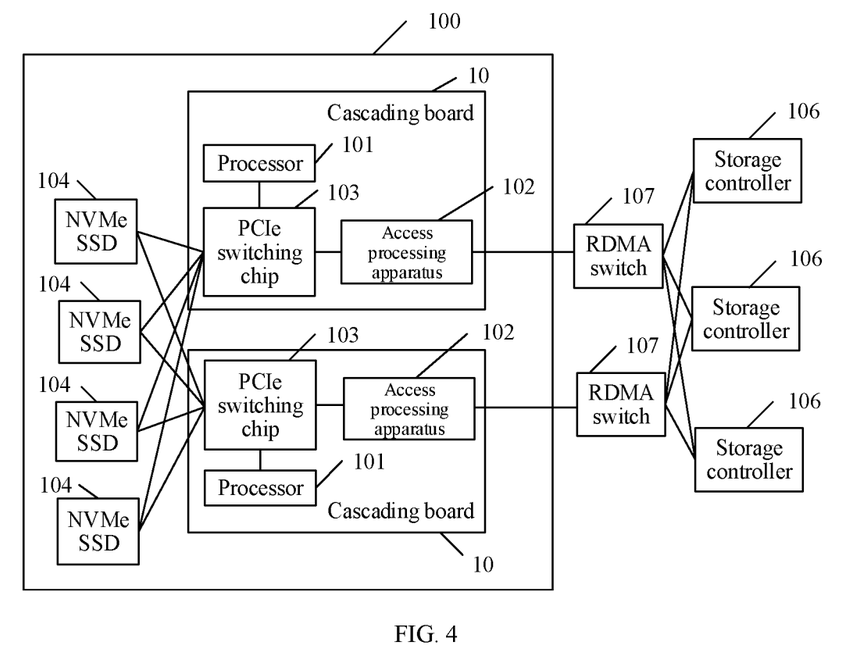
FIG. 4 is a diagram of a basic framework of another SSD shared remote access system according to an embodiment of the present disclosure.

FIG. 4 is a diagram of a basic framework of another SSD shared remote access system according to an embodiment of the present disclosure.

Referring to FIG. 4, the SSD shared remote access system in this embodiment includes a plurality of storage controllers 106. The plurality of storage controllers 106 are connected to one or more disk enclosures 100 using a plurality of RDMA switches 107, such as two RDMA switches 107. The disk enclosure 100 is a dual-controller disk enclosure, and includes two disk enclosure management units (designated as cascading boards) 10. The disk enclosure management unit 10 may be a cascading board. Each disk enclosure management unit 10 includes a management processor (CPU) 101, a PCIe switching chip 103, and an access processing apparatus (e.g. FPGA/ASIC) 102. The two disk enclosure management units 10 are connected to a specific quantity of standard dual-port NVMe SSDs 104.

It should be noted that the system shown in FIG. 4 is merely an example. A quantity of storage controllers 106, a quantity of RDMA switches 107, a quantity of disk enclosure management units 10, and a quantity of NVMe SSDs 104 shown in FIG. 4 are not limited. Within the scope of the present disclosure, each apparatus may be in any other quantity to implement the present disclosure. For example, in an embodiment of the present disclosure, the disk enclosure 100 may be a single-controller device, that is, the disk enclosure 100 includes only one disk enclosure management unit (that is, a cascading board) 10. For another example, the NVMe SSD may be a standard single-port NVMe SSD.

In the embodiments of the SSD shared remote access system, the CPU may initialize the access processing apparatus and the SSD, and the access processing apparatus implements RDMA access to the SSD when receiving an access command from the RDMA network. In this way, remote direct access to the NVMe SSD can be implemented with a minimal delay.

Figure 5:
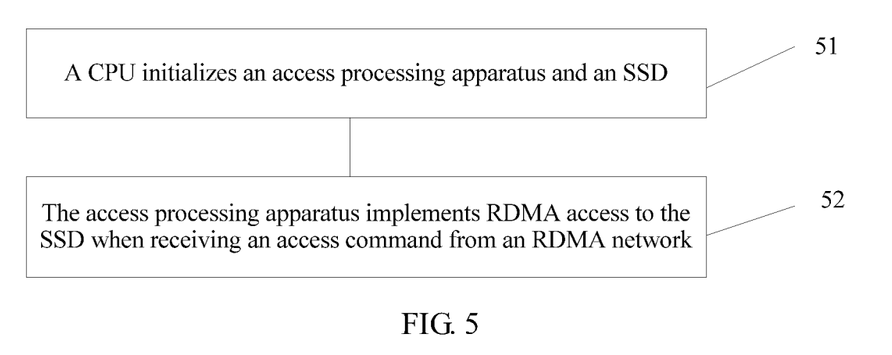
FIG. 5 is a flowchart of a SSD shared remote access method according to an embodiment of the present disclosure.

An embodiment of the present disclosure further provides an SSD shared remote access method. The following describes the SSD shared remote access method according to this embodiment of the present disclosure with reference to FIG. 5. Referring to FIG. 5, the SSD shared remote access method provided in this embodiment of the present disclosure may include the following steps.

Step 51. A CPU initializes an access processing apparatus and an SSD.

Step 52. The access processing apparatus implements RDMA access to the SSD when receiving an access command from an RDMA network.

The access processing apparatus may be an FPGA or ASIC.

Optionally, in an embodiment, that a CPU initializes an access processing apparatus in step 51 may include allocating, by the CPU according to configuration information of an access queue, a storage space that is used to store the access queue and that is on the access processing apparatus, and initializing the access queue, and designating, by the CPU, an interrupt receive end as the access processing apparatus.

Optionally, in another embodiment, that the access processing apparatus implements RDMA access to the SSD when receiving an access command in step 52 may include prompting, by the access processing apparatus, an SSD corresponding to the access command to perform an access operation when receiving the access command, and returning, by the access processing apparatus, data or status information using the RDMA network after receiving an interrupt from the SSD.

According to the SSD shared remote access method in this embodiment of the present disclosure, the CPU initializes the access processing apparatus and the SSD, and the access processing apparatus completes RDMA to the SSD such that an initialization process and an access process can be two processes independent of each other. Such hardware as the access processing apparatus (such as an FPGA or ASIC) is added to complete the RDMA access to the SSD such that a software processing time added because the CPU implements the RDMA access to the SSD may be avoided, a delay of shared remote access to the SSD can be reduced, and the shared remote access to the SSD is implemented without an increase in an access time.

To facilitate further understanding of a specific implementation process of the present disclosure, the initialization and access processes are further described below with reference to FIGS. 1-3.

After a cascading board 10 is powered on, a process of performing initialization by a CPU 101 may be as follows.

(1) The cascading board 10 is powered on and started.

(2) The CPU 101 performs PCIe peripheral initialization, for example, initializing some related registers.

(3) The CPU 101 initializes an access processing apparatus 102, and establishes communication between the access processing apparatus 102 and a storage controller 106.

(4) The CPU 101 performs device initialization on an SSD 104.

(5) The CPU 101 obtains queue configuration information from the CPU 101 or obtains queue configuration information from the storage controller 106 according to a preset policy, allocates a storage space (such as a RAM) on the access processing apparatus 102, initializes an NVMe access queue, obtains, according to an NVMe protocol requirement, a doorbell address and an interrupt number that are corresponding to each access queue, and writes, according to an NVMe rule, the doorbell address and the interrupt number that are corresponding to each access queue into corresponding address spaces on the access processing apparatus 102 and an SSD 104.

(6) The CPU 101 configures a PCIe switching chip 103, and designates an interrupt receive end as the access processing apparatus 102.

(7) The CPU 101 sends a head pointer and a tail pointer of the access queue to the storage controller 106.

When initializing the NVMe access queue in step (5), the CPU 101 can obtain the head pointer and the tail pointer of the access queue. Further, the CPU 101 can send the head pointer and the tail pointer of the access queue to the storage controller 106 in step (7).

It should be noted that the foregoing initialization process is described using an example in which the cascading board 10 includes the PCIe switching chip. When the cascading board 10 does not include the PCIe switching chip 103, an initialization process is similar to the foregoing process, and only initialization content related to the PCIe switching chip 103 needs to be removed. Details are not described herein.

The system shown in FIG. 4 is used as an example. After initialization is performed according to the foregoing initialization procedure, the disk enclosure 100 may send, using the network, the initialized NVMe queue and the head pointer and the tail pointer of the NVMe queue to all the connected storage controller 106. A plurality of storage controllers 106 may obtain some or all resources in the disk enclosure 100 through negotiation, to avoid a data consistency risk caused by an access conflict.

In this way, after the CPU 101 completes the initialization by performing the foregoing process, when subsequently receiving a hard disk access request from the network 110 (for example, the RDMA network), the cascading board 10 in the disk enclosure 100 sends the hard disk access request to the access processing apparatus 102 for processing, and the access processing apparatus 102 implements RDMA access to the SSD 104.

The following uses a typical read/write access procedure as an example for description. A process of performing a remote read/write operation on an SSD may be as follows.

A storage controller 106 selects a required access queue, and finds a head address and a tail address of the access queue.

The storage controller 106 writes a read/write command into an SQ queue on a memory 102-3 in an access processing apparatus 102.

The access processing apparatus 102 rings a corresponding hard disk doorbell according to a correspondence between an access queue and a doorbell number.

A hard disk (for example, a PCIe SSD) 104 obtains the command in the SQ queue stored in the memory 102-3, and executes the command.

After executing the command, an execution result is written into a CQ queue in the hard disk 104, and an interrupt to the access processing apparatus 102 is initiated.

After receiving the interrupt, the access processing apparatus 102 returns data or status information to the storage controller 106.

After receiving the data or the status information, the storage controller 106 maintains the tail pointer of the access queue, and updates the head pointer of the access queue.

The read/write operation ends.

It can be learned from above that, according to the SSD shared remote access method, the cascading board, and the SSD shared remote access system provided in the embodiments of the present disclosure, the access processing apparatus 102 (for example, the FPGA/ASIC) may implement direct access to the NVMe SSD 104, and share the NVMe SSD 104 having a standard PCIe interface with the plurality of storage controllers 106 using the RDMA network such that shared remote access to the NVMe SSD 104 is implemented without an increase in an access time.

It should be noted that the SSD shared remote access apparatus (such as the cascading board 10) provided in the foregoing embodiments and the SSD shared remote access method embodiments belong to a same concept. Therefore, for corresponding parts between the method embodiments and the apparatus embodiments, reference may be made to each other. For repeated content, details are not described herein.

It should be noted that the embodiments in this specification are all described in a progressive manner, each embodiment focuses on a difference from other embodiments, and for same or similar parts in the embodiments, reference may be made to these embodiments. An apparatus embodiment is basically similar to a method embodiment, and therefore is described briefly. For related parts, reference may be made to partial descriptions in the method embodiment.

It should be noted that, in this specification, the terms "include," "comprise," or their any other variant is intended to cover a non-exclusive inclusion such that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely examples of the embodiments of the present disclosure, but are not intended to limit the present disclosure. Any modification, equivalent replacement, and improvement made without departing from the principle of the present disclosure shall fall within the protection scope of the present disclosure.

What is claimed is:

1. A solid-state drive (SSD) shared remote access system comprising:
   a hard disk comprising an SSD; and
   a cascading board coupled to the hard disk and comprising:
      a first end configured to couple to a remote direct memory access (RDMA) network;
      a second end coupled to the SSD;
      an access processing apparatus comprising:
         an access queue comprising a completion queue (CQ); and
         a field-programmable gate array (FPGA) or an application-specific integrated circuit (ASIC); and
      a processor coupled to the hard disk and the access processing apparatus and configured to:
         obtain a doorbell address and an interrupt number corresponding to the access queue;
         write, according to a Non-Volatile Memory Express (NVMe) rule, the doorbell address and the interrupt number into a corresponding address space on the access processing apparatus;
         write a correspondence between the access queue and a doorbell number of the hard disk to the access processing apparatus; and
         designate the access processing apparatus as an interrupt receiving end, wherein the access processing apparatus is configured to:
            knock a doorbell of the hard disk according to the correspondence after detecting that an access command has been written to the access queue; and
            send data or status information to a storage controller after receiving an interrupt from the hard disk,
   wherein the cascading board is a management unit in a disk enclosure and manages NVMe and RDMA operations in the disk enclosure, and
   wherein the hard disk is configured to:
      obtain the access command in the access queue;
      execute the access command to obtain an execution result;
      write the execution result into the access queue and the CQ after executing the access command; and
      initiate the interrupt to the access processing apparatus.

2. The SSD shared remote access system of claim 1, wherein the processor is further configured to:
   obtain a head pointer and a tail pointer of the access queue before the access processing apparatus knocks the doorbell; and
   send the head pointer and the tail pointer to the storage controller to prompt the storage controller to store the head pointer and the tail pointer to write the access command into the access queue.

3. The SSD shared remote access system of claim 1, wherein the access queue further comprises a submission queue (SQ).

4. The SSD shared remote access system of claim 1, wherein the processor is further configured to initialize the access processing apparatus.

5. The SSD shared remote access system of claim 1, wherein the processor is further configured to establish communication between the access processing apparatus and the storage controller.

6. The SSD shared remote access system of claim 1, wherein the processor is further configured to perform device initialization on the hard disk.

7. The SSD shared remote access system of claim 1, wherein the processor is further configured to obtain queue configuration information from the storage controller according to a preset policy.

8. The SSD shared remote access system of claim 1, wherein the processor is further configured to initialize the access queue.

9. The SSD shared remote access system of claim 3, wherein the correspondence is further between the SQ and the doorbell number.

10. The SSD shared remote access system of claim 9, wherein the hard disk is further configured to:
   obtain the access command in the SQ; and
   execute the access command to obtain the execution result.

11. A solid-state drive (SSD) shared remote access system comprising:
   a storage controller;
   a hard disk coupled to the storage controller and comprising an SSD; and
   a cascading board coupled to the storage controller by a network and comprising:
     an access processing apparatus comprising:
       a network chip; and
       a field-programmable gate array (FPGA) or an application-specific integrated circuit (ASIC); and
     a processor coupled to the access processing apparatus and configured to:
       allocate, according to configuration information of an access queue, a storage space in the access processing apparatus to store the access queue;
       initialize the access queue;
       obtain a doorbell address and an interrupt number corresponding to the access queue;
       write, according to a Non-Volatile Memory Express (NVMe) rule, the doorbell address and the interrupt number into a corresponding address space on the access processing apparatus;
       write a correspondence between the access queue and a doorbell number of the hard disk to the access processing apparatus;
       designate the access processing apparatus as an interrupt receiving end;
       obtain a head pointer and a tail pointer of the access queue; and
       send the head pointer and the tail pointer to the storage controller,
   wherein the access processing apparatus is configured to:
     knock a doorbell of the hard disk according to the correspondence after the storage controller writes an access command to the access queue; and
     send data or status information to the storage controller after receiving an interrupt from the hard disk,
   wherein the cascading board is a management unit in a disk enclosure and manages NVMe and RDMA operations in the disk enclosure,
   wherein the hard disk is configured to:
     obtain the access command in the access queue;
     execute the access command to obtain an execution result;
     write the execution result into the access queue; and
     initiate the interrupt to the access processing apparatus, and
   wherein the storage controller is configured to store the head pointer and the tail pointer to write the access command into the access queue.

12. The SSD shared remote access system of claim 11, wherein the access queue comprises a submission queue (SQ).

13. The SSD shared remote access system of claim 12, wherein the correspondence is further between the SQ and the doorbell number.

14. The SSD shared remote access system of claim 13, wherein the hard disk is further configured to obtain the access command in the SQ.

15. The SSD shared remote access system of claim 14, wherein the hard disk is further configured to execute the access command.

16. The SSD shared remote access system of claim 11, wherein the access queue comprises a completion queue (CQ).

17. The SSD shared remote access system of claim 16, wherein the hard disk is further configured to write the execution result into the CQ.

18. The SSD shared remote access system of claim 17, wherein the hard disk is further configured to initiate the interrupt to the access processing apparatus.

19. A solid state drive (SSD) shared remote access method implemented by an access processing apparatus comprising a field-programmable gate array (FPGA) or an application-specific integrated circuit (ASIC), the SSD shared remote access method comprising:
   receiving a correspondence between an access queue and a doorbell number of a hard disk, wherein the access queue comprises a submission queue (SQ), and wherein the correspondence is further between the SQ and the doorbell number;
   storing the access queue;
   receiving an access command to the access queue;
   detecting that the access command has been written to the access queue;
   obtaining a doorbell address and an interrupt number corresponding to the access queue;
   writing, according to a Non-Volatile Memory Express (NVMe) rule, the doorbell address and the interrupt number into a corresponding address space on the access processing apparatus;
   knocking, after the detecting, a doorbell of the hard disk according to the correspondence;
   storing an execution result of the access command into the access queue; and
   sending data or status information after receiving an interrupt from the hard disk.

* * * * *